W. H. Miller,
Piston Packing.
No. 63,285. Patented Mar. 26, 1867.
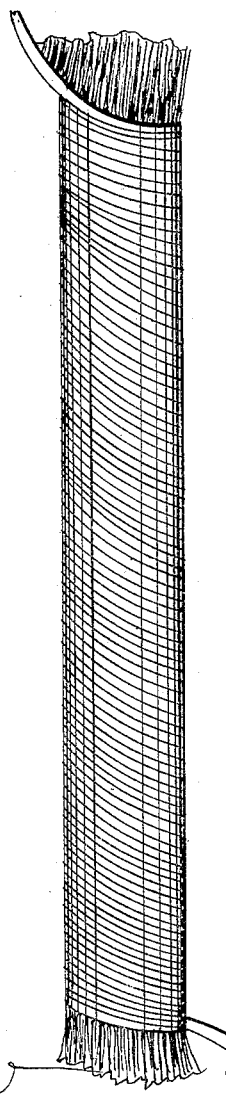
Witnesses:
J. E. Shaw
N. S. Snedeker
Inventor:
Wm Bently Miller

United States Patent Office.

WILLIAM H. MILLER, OF PHILADELPHIA, PENNSYLVANIA.

Letters Patent No. 63,285, dated March 26, 1867.

IMPROVEMENT IN PACKING FOR PISTON-RODS.

The Schedule referred to in these Letters Patent and making part of the same.

TO ALL WHOM IT MAY CONCERN:

Be it known that I, WILLIAM H. MILLER, of the city of Philadelphia, in the State of Pennsylvania, have invented a new and useful Improvement in Covered Packings for the Joints of Steam Engines, Pumps, and other Machinery requiring packing; and I do hereby declare that the following is a full and exact description of the same, reference being had to the annexed drawing, which represents a perspective view of a section of my improved packing.

It is composed of a number of strands of cotton or other fibrous material, saturated with powdered soap-stone or other powdered lubricant, the whole being covered by having yarn wound around it continuously.

Letters Patent for a cover, as applied to packing, having been granted to me on the 29th day of November, 1864, I do not desire herein to claim broadly the application of a cover to packing; but what I do claim herein, and desire to secure by Letters Patent, is—

A new manufacture consisting of packing composed of a filling of fibrous or other materials covered with cotton, woollen, or other yarn, saturated with powdered soap-stone or other equivalent material, and wound around the filling, substantially as shown and described.

WM. HARTLEY MILLER.

Witnesses:
  J. E. SHAW,
  GEO. E. BUCKLEY.